June 20, 1944. H. LIEBER Re. 22,499

BONE CONDUCTION HEARING-AID

Original Filed Dec. 24, 1932

HUGO LIEBER, DECEASED,
BY LIEBER PATENTS CORP.,
ASSIGNEE

By S M Pinales
Attorney

Reissued June 20, 1944

Re. 22,499

UNITED STATES PATENT OFFICE 22,499

BONE CONDUCTION HEARING-AID

Hugo Lieber, deceased, late of New York, N. Y., by Lieber Patents Corporation, assignee, Elmsford, N. Y.

Original No. 2,077,425, dated April 20, 1937, Serial No. 648,733, December 24, 1932. Renewed February 28, 1934. Application for reissue April 14, 1939, Serial No. 267,932

9 Claims. (Cl. 179—107)

This invention relates to bone conduction hearing-aids, and it has among its objects an improved bone conduction receiver of small size and light weight suitable for inconspicuous wear by the user and able to impart to the bone structure of a hard of hearing person the vibratory energy required for inducing hearing in his auditory nerve center.

The foregoing and other objects of the invention will be best understood from the following description, reference being made to the accompanying drawing, in which Fig. 1 is a view of the vibrator element illustrating how a bone conduction receiver of the invention may be held against the bone structure of the upper portion of the spinal column of a person hard-of-hearing;

Figure 1:
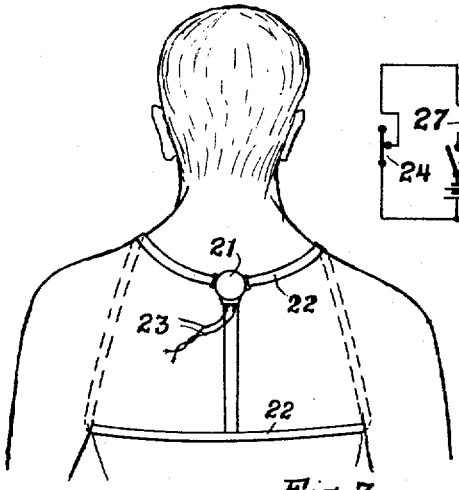

Although it has been known for many years that a large percentage of persons with impaired hearing have satisfactory interior hearing organs and that they are able to hear well by bone conduction, prior bone conduction hearing devices or receivers proved impractical because they were all large and cumbersome and could not be made small enough for inconspicuous wear by the user.

As shown by Kranz Patent 1,540,783, it has also been well known that electromagnetic bone conduction receivers have to be provided with a relatively stiff diaphragm so that when it is actuated by an electromagnet which is energized with speech frequency oscillations, the diaphragm vibrates with large forces and small amplitudes required in order to impart to the hearing inducing bones of the user the vibratory energy required to induce satisfactory hearing of speech by bone conduction.

In applicant's copending application Serial No. 614,674, filed June 1, 1932, Patent 1,940,553, there is disclosed a novel wearable hearing-aid bone receiver of applicant's invention, in which a vibrating mechanism unit light and small enough for comfortable and inconspicuous wear coupled to a hearing inducing bone of the user, and having an overall mass of only about 16 grams and an overall volume of only about 7 cubic centimeters, is designed and arranged to operate efficiently with a resonance in the speech frequency range of about 1000 cycles so as to enable the user to hear speech intelligibly by bone conduction, even when used in a standard hearing aid circuit formed of a conventional hearing aid amplifier, battery and microphone, all designed for hidden and inconspicuous wear on the body of the user.

The hearing-aid bone receiver unit of the present invention comprises a driving portion and a driven portion and intermediate relatively stiff elastic elements interconnecting said driving and driven portions so as to permit a limited vibratory movement between the driving and driven portions throughout the principal speech frequency range under the action of corresponding electric oscillations applied thereto. A casing which forms part of the vibratory bone-receiver unit is secured to the driving portion, and the driven portion has secured thereto a contactor arranged for engaging the bone structure of the user. The contactor forms part of a wall of the casing which has lateral dimensions sufficiently extended and so arranged under the vibratory unit as to maintain it in a stable equilibrium coupling position on the bone structure under a relatively small external force, the bone receiver unit being provided with supporting means mechanically coupled to its driving portion for holding its driven portion with the contactor in engagement with the bone of the user so that the contactor may vibrate relatively to said driven portion and the supporting means when the unit is energized for transmitting the vibrations of the contactor through the bone structure to the inner ear. The mass of the driving portion is only a small fraction of the mass of the body of the bone structure against which it is held, and sufficiently large and sufficiently actuated by the electric means as to impart to the driven portion and through its contactor to the bone the vibratory energy required for inducing intelligible hearing of speech by bone conduction.

Figure 2:
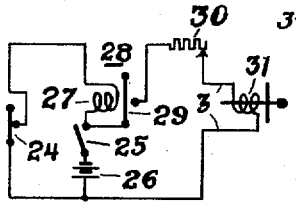
Fig. 2 is a circuit diagram of a hearing-aid device.
Figure 5:
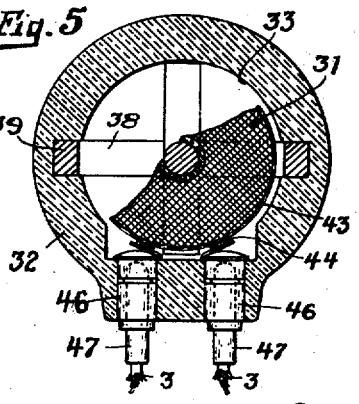
Fig. 5 is a horizontal sectional view through the receiver along line 5—5 of Fig. 4.

Fig. 1 illustrates a hard-of-hearing person having a bone conduction receiver 21 of the invention held pressed against a spinal column bone by means of a light harness of flexible straps 22, the receiver being connected through a flexible double conductor cord 23 with the associated elements, in accordance with the diagram of Fig. 2. The complete hearing-aid comprises a transmitter microphone 24 connected through a cutout switch 25 in series with a battery 26 and actuating coil 27 of a microphone amplifier 28, the microphone 29 of which is connected through switch 25 in series with battery 26 and rheostat 30 to the actuating coil 31 of the bone conduction receiver 21 as in similar air conduction hearing-aids.

Figure 6:
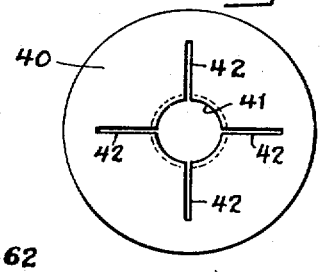
Fig. 6 is a top view and Fig. 7 is a cross sectional view of the pole plate of the receiver.
Figure 7:
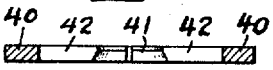

The bone conduction receiver 21 is shown in detail in Figs. 3 to 7 and comprises a casing 32 within which is mounted an electromagnetic vibrator core structure comprising a central core 34 surrounded by the actuating coil 31 and two L-shaped permanent magnets 38 so as to produce with the pole plate 40, shown in detail in Figs. 6 and 7, a flux in the annular gap between the core and the pole plate.

Mounted above the pole plate within the casing opening is a diaphragm unit 51 comprising a circular resilient sheet-metal diaphragm 52 held radially tensioned by a tension ring 53. The tension ring may be, for instance, made from a split ring of larger diameter compressed to the diameter of the diaphragm and soldered to the edge thereof so that under the action of the forces tending to restore the ring to its original position, a uniform radial tension is applied to the diaphragm.

To the underside of the diaphragm is secured, as by soldering, a flat circular armature 54 of soft iron. The lower surface 55 of the armature 54 is parallel to the pole faces of the central core member 34 and the pole plate 40 and is spaced therefrom by a small gap 56 to provide a path for the permanent flux of the magnets 38 and of the induced flux of coil 31. The diaphragm unit is held firmly in place within the casing by means of a locking ring 56 which is screwed in within the threaded upper end of the interior casing wall, thin washers 57 serving to properly space the diaphragm unit with respect to the pole faces 35 and 49.

The open side of the casing is closed by a cover 60 mounted on an external threaded portion of the casing, and a lock nut ring 63 serves to lock the cover in the desired operating position. The central portion of the cover 60 has a central cylindrical opening 65 for guiding a contact button 66 mounted on a rod 67 extending from the center of the armature 54. The contact button 66 may be mounted in place before inserting the cover by placing it with its central hole over the upper projection of the rod 67 and soldering the two together at the top end, a thin cap 68, of a nonoxidizing material, for instance, gold, being soldered over the top of the junction to form the exterior contact surface of the button 66.

Figure 4:
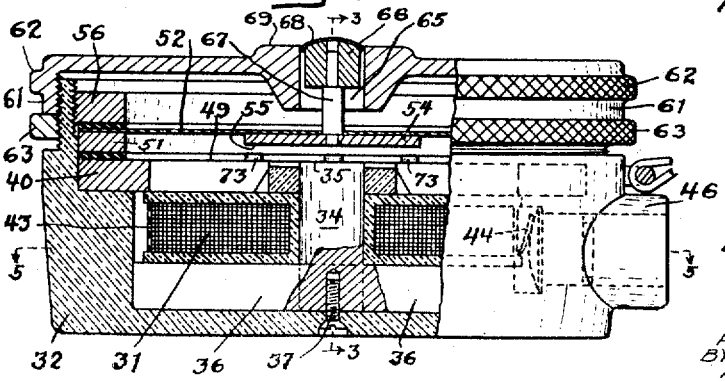
Fig. 4 is a vertical sectional view of the receiver along line 4—4 of Fig. 3.
Figure 9:
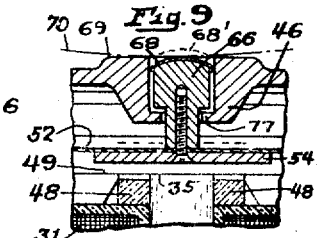

The outer side of the central enlargement 64 of the cover 60 forms a supporting surface 69 around the contact button 66. When the bone receiver shown is held in a released condition, free from engagement with the bone structure, the outer surface 68 of the contact button projects slightly above the supporting surface 69 of the casing cover, as shown in Fig. 4. When the vibratory unit forming the bone receiver is held in its operative position on the bone, and is actuated by electric oscillations of the principal speech frequency range, its massive driving portion which is formed by the relatively heavy magnetic structure with its energizing windings 31 and the main part of the casing 32 is supported by the elastic diaphragm 52, at a small magnetic gap spacing from the armature 55 and the contactor 66 which is secured thereto, and which form the driven vibratory portion which acts on the bone structure. The contactor 66 forms part of the casing wall 60, which is so arranged under the driving vibratory portion as to maintain the contactor 66 and the entire vibratory unit in an efficient stable equilibrium coupling position on the bone when it is held against it by a support which is pivotally connected to the casing and applies thereto only a relatively small external force. The mass of the driving portion, although only a small fraction of the mass of the body of the bone structure, is sufficiently large and is sufficiently actuated by the electric oscillations as to impart to the driven vibratory portion and through its contactor 66 to the bone the vibratory energy required for inducing intelligible hearing of speech by bone conduction.

Figure 3:
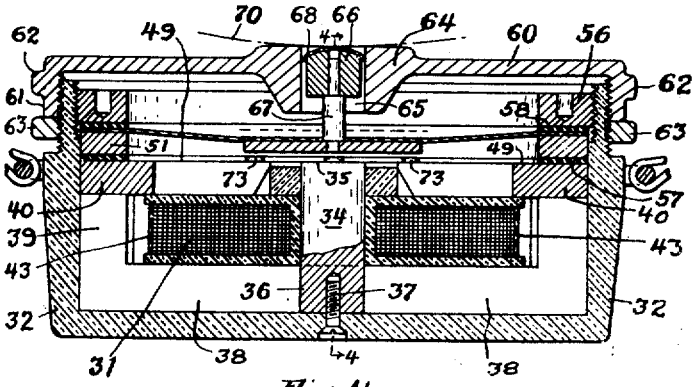
Fig. 3 is a vertical sectional view through the bone conduction receiver along line 3—3 of Fig. 4.

If the bone conduction receiver is in released condition, that is, not held pressed with the contact button 66 against the bone structure to which vibrations are to be imparted, and the vibrator is connected to the operating circuit as shown in Fig. 2, only a permanent flux is induced in the gaps 56 between the pole faces of the magnet core and the opposite armature face, the flux passing between the inner pole face 35 through the short gap to the armature 54 and then radially through the armature to the outer periphery thereof, and therefrom back through the gap to the outer pole face 49 of the pole plate 40 and therethrough to the opposite poles of the L-shaped magnets, a part of the flux being also induced by the steady current flowing through the coil 31 from the battery 26. This flux will tend to pull the armature 54 towards the pole faces underneath, but the diaphragm 52 is made sufficiently stiff to oppose this magnetic pull and to keep it in the position where the contact button 66 projects above the supporting surface 69, as shown in Fig. 4. On pressing the vibrator against the body, the contact surface 68 is pressed inwardly into the opening 65 of the cover until the outer contact surface 68 of the button lies flush with the supporting surface 69, as shown in Fig. 3, the body portion being indicated by line 70. This brings the armature nearer to the pole pieces, decreasing the air gap.

In accordance with one phase of the invention, the bone receiver shown is enabled to operate with a very small gap by arranging the contact button 66 to project above the surrounding supporting surface 69 of the casing when in released position as shown in Fig. 4, and to be pushed into the casing, when it is pressed with the button surface 68 against the bone structure, till it reaches a position where the outer contact surface of the button is substantially flush with the adjacent supporting surface of the casing. This small inward motion of the button is accompanied by a corresponding small motion of the diaphragm till the armature reaches a predetermined operating distance from the pole faces beyond which it cannot be pushed by the button. This operating gap is made only little larger than the freezing gap distance so that the armature may vibrate in the region close to the gap zone in which it would be caused to freeze, but, nevertheless, stay outside the freezing zone and vibrate under the action of the normal flux fluctuations induced by the coil. By thus bringing the armature to a position where the gap is larger than the freezing zone and yet not too large, the vibrator is able to develop relatively large power in a structure small enough to be inconspicuously worn on the body of the user.

In the use of such vibrators, sound vibrations stronger than normal will often occur. In such cases the current flowing through the actuating coil 31 may momentarily become so large as to increase the flux in the gap to a value at which the armature vibrating near the border of the normal freezing zone will be pulled over by the increased flux and become frozen notwithstanding that under normal operation no such pull over will occur. Such momentary freezing of the armature is quite frequent if the operating gap of the armature is made close to the freezing zone, and very little advantage would be gained by choosing such small gaps because once the armature is frozen to the pole faces, the circuit must be cut off and the vibrator shaken to get the armature out of the freezing position.

In accordance with the invention, this difficulty is overcome to a substantial extent by preventing permanent freezing of the armature to the pole faces in the presence of excessive magnetic fluxes in the gap, and instantaneous restoration of the vibrator to the non-freezing condition upon the disappearance and passing of excessive momentary magnetic fluxes. This is effected by attaching thin flat spacers 73, as by soldering, to the pole face 49 of the pole plate 39, these spacers being of non-magnetic material, for instance, brass, and stopping the downward movement of the armature at a distance before it contacts with the pole faces. With such spacers, a large magnetic force produced by a speech current impulse, although it might cause momentary pulling in of the armature into the freezing zone, will not be able to produce any permanent freezing of the armature, and the armature will be free to return to normal operating position.

In the practical construction of a vibrator of the invention, satisfactory results may be obtained by limiting the inward movement of the contact button 66 so that in the position to which the button is brought by compressing it against the body, the operating gap between the armature surface and the pole faces of the magnet core is about 3 to 4 mils. The stop members 73 should be of a thickness of about 1 to 2 mils and prevent the armature from coming near the pole faces closer than that distance. A vibrator made to operate with such gap spacing and constructed in the way shown in Figs. 3 to 7 may be made to have an outside diameter of about 60 millimeters and a height of about 25 millimeters, being thus inconspicuous and readily adapted for wear on the body of the user.

Exact adjustment of the normal operating position at which the contact surface of the button is flush with the surrounding supporting surface of the cover may be effected by turning the cover one way or another by means of ridge 62, the nut 63 serving to lock the cover in adjusted position.

Figure 8:
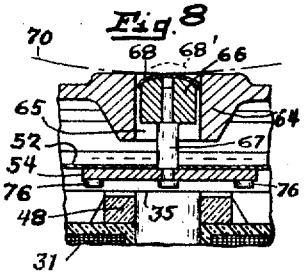
Figs. 8 and 9 are vertical sectional views similar to Fig. 3 of the center portion of a receiver embodying modifications of the invention.

Instead of securing the armature stops 73 to the pole face 49 of the pole plate 40, these stops may be secured to the under-surface of the armature 54 as shown at 76 in Fig. 8, the stops being attached by soldering, for instance, and having a thickness of about 1 to 2 mils as before.

The novel combination of a bone conduction receiver with coupling means for imparting hearing-inducing vibrations to the vertebrae of the spinal column of a deafened person so as to enable him to hear without making his impairment conspicuous is claimed in copending application Serial No. 21,706, filed May 16, 1935, as a continuation in part of the present application, now Patent 2,077,426. Bone conduction receivers of the type disclosed herein may, of course, also be worn on the head of the user, for instance, in the manner disclosed in applicant's Patent 1,940,553, by a spring headband serving to hold the bone receiver, with the contactor coupled to the mastoid bone, behind the ear.

Various other modifications of the invention will suggest themselves to those skilled in the art. It is accordingly desired that in construing the breadth of the appended claims they shall not be limited to the specific details shown and described in connection with the exemplifications of the invention.

What is claimed is:

1. In a portable bone conduction hearing-aid device, an electromagnetic bone conduction receiver of small size suitable for inconspicuous wear by the user comprising a magnetic core of substantial mass having a pole face, a casing enclosing said core, a magnetic armature resiliently supported by said casing at a gap spacing of the order of 2 mils adjacent said pole face, windings interlinked with said core for inducing in said gap magnetic forces imparting sound-frequency vibrations to said armature across said gap, a cover for said casing having an opening facing said armature, a contact member extending from said armature having an external contact surface projecting through said cover opening for engaging hearing-inducing bone structure of the user, and resilient supporting means for carrying said receiver in a floating condition and pressing the contact surface of said contact member against hearing-inducing bone structure while said contact member is subjected to forces tending to freeze said armature to said pole face, and means for adjustably locking said cover in a position at which the portion of the cover adjacent said opening limits the inward movement of said contact member to a position in which said gap is maintained at a sufficiently small length for producing by the action of the floating mass of said receiver hearing-inducing vibratory forces imparted to said bone structure without freezing said gap.

2. In an audiphone, the combination of electromagnetic means adapted to respond to varying currents substantially throughout the audible frequency range, a casing secured thereto, a relatively stiff vibratory member operatively associated with the means for vibration thereby, a contactor connected to the member and forming at least part of a wall of the casing, resilient means between the contactor and the casing whereby the contactor can vibrate relatively to the casing, and means supporting the casing with the contactor in operative contact with the bone structure of the user for conducting its vibrations therethrough to the inner ear.

3. In an audiphone, the combination of a casing, vibratory means in the casing comprising two members having unequal inertias resiliently associated for limited relativel movement between at least portions of both members, means securing one of said members to the casing, electromagnetic means adapted to respond to varying currents substantially throughout the audible frequency range secured to said portion of one of said members and operatively opposed to said portion of the other member for relatively vibrating the same, a contactor forming at least part of a wall of the casing connected to the unsecured member for movement relatively to the casing in accordance with said vibration, and means supporting said casing with said contactor in operative contact with the bone structure of the user for conducting its vibrations therethrough to the inner ear.

4. In an audiphone, the combination of a casing, vibrator means in the casing comprising two members having unequal inertias resiliently associated for limited relative movement between at least portions of both members, means securing the member having greater inertia to the casing, electromagnetic means adapted to respond to varying currents substantially throughout the audible frequency range secured to said portion of one of said members and operatively opposed to said portion of the other member for relatively vibrating the same, a contactor forming at least part of a wall of the casing connected to the unsecured member for movement relatively to the casing in accordance with said vibration, and means supporting said casing with said contactor in operative contact with the bone structure of the user for conducting its vibrations therethrough to the inner ear.

5. In an audiphone, the combination of a vibratory mechanism comprising two members, relatively stiff spring means connecting said members permitting a limited relative movement between at least portions of both members, electrical means adapted to respond to varying currents within the audible frequency range secured to said portion of one of said members and operatively opposed to said portion of the other member for relatively vibrating the same, a casing for said mechanism secured to one of said members, a contactor directly secured to one of said members for engaging the user and forming at least part of a wall of the casing, and supporting means firmly mechanically coupled to the member that is not directly secured to the contactor for holding the said last named member substantially stationary with the contactor in engagement with the bone structure of the user, whereby the contactor is free to vibrate relatively to said last-named member and said supporting means when said electrical means is energized for transmitting the vibrations of the contactor through the bone structure to the inner ear.

6. In a wearable bone conduction hearing aid device, a vibratory unit sufficiently light and small enough for comfortable and substantially inconspicuous wear coupled to a hearing inducing bone structure of the user and comprising a driving portion, a driven portion and intermediate relatively-stiff elastic elements interconnecting said driving and driven portions so as to permit a limited vibratory movement between at least parts of both portions; electrical means secured to one of said portions for actuating said portions throughout the principal speech frequency range and producing corresponding vibrations between said portions; a casing forming part of said unit and secured to said driving portion; a contactor directly secured to said driven portion for engaging the bone structure of the user; said contactor forming at least part of a wall of said casing having a wall portion with lateral dimensions sufficiently extended and so arranged under the driving portion as to maintain said vibratory unit in a stable equilibrium coupling position on the bone structure under a relatively small external force; and supporting means firmly mechanically coupled to the driving portion for holding said driven portion with the contactor in engagement with said bone so that the contactor vibrates relatively to said driving portion and said supporting means when said unit is actuated by the electrical means for transmitting the vibrations of the contactor through the bone structure to the inner ear; the mass of said driving portion being only a small fraction of the mass of the body of said bone structure, and being sufficiently large and sufficiently actuated by said electrical means as to impart to said driven portion and, through its contactor to the bone, the vibratory energy required for inducing intelligible hearing of speech by bone conduction.

7. In a wearable bone conduction hearing aid device, a vibratory unit sufficiently light and small enough for comfortable and substantially inconspicuous wear coupled to a hearing inducing bone structure of the user and comprising a driving portion, a driven portion and intermediate relatively-stiff elastic elements interconnecting said driving and driven portions so as to permit a limited vibratory movement between at least parts of both portions; electrical means secured to said driving portion for actuating said portions throughout the principal speech frequency range and producing corresponding vibrations between said portions; a casing forming part of said unit and secured to said driving portion; a contactor directly secured to said driven portion for engaging the bone structure of the user; said contactor forming at least part of a wall of said casing having a wall portion with lateral dimensions sufficiently extended and so arranged under the driving portion as to maintain said vibratory unit in a stable equilibrium coupling position on the bone structure under a relatively small external force; and supporting means firmly mechanically coupled to the driving portion for holding said driven portion with the contactor in engagement with said bone so that the contactor vibrates relatively to said driving portion and said supporting means when said unit is actuated by the electrical means for transmitting the vibrations of the contactor through the bone structure to the inner ear; the mass of said driving portion being only a small fraction of the mass of the body of said bone structure, and being sufficiently large and sufficiently actuated by said electrical means as to impart to said driven portion and, through its contactor to the bone, the vibratory energy required for inducing intelligible hearing of speech by bone conduction.

8. In a wearable bone conduction hearing aid device, a vibratory unit sufficiently light and small enough for comfortable and substantially inconspicuous wear coupled to a hearing inducing bone structure of the user and comprising a driving magnetic portion, a driven magnetic portion and intermediate relatively-stiff elastic elements interconnecting said driving and driven portions so as to permit a limited vibratory movement between at least parts of both portions; said driving and said driven portions having elements forming part of a magnetic structure including a magnetic gap across which said portions vibrate; electrical means secured to one of said portions for actuating said portions throughout the principal speech frequency range and producing corresponding vibrations between said portions; a casing forming part of said unit and secured to said driving portion; a contactor directly secured to said driven portion for engaging the bone structure of the user; said contactor forming at least part of a wall of said casing having a wall portion with lateral dimensions sufficiently extended and so arranged under the driving portion as to maintain said vibratory unit in a stable equilibrium coupling position on the bone structure under a relatively small external force; and supporting means firmly mechanically coupled to the driving portion for holding said driven portion with the contactor in engagement with said bone so that the contactor vibrates relatively to said driving portion and said supporting means when said unit is actuated by the electrical means for transmitting the vibrations of the contactor through the bone structure to the inner ear; the mass of said driving portion being only a small fraction of the mass of the body of said bone structure, and being sufficiently large and sufficiently actuated by said electrical means as to impart to said driven portion, and through its contactor to the bone, the vibratory energy required for inducing intelligible hearing of speech by bone conduction.

9. In a wearable bone conduction hearing aid device, a vibratory unit sufficiently light and small enough for comfortable and substantially inconspicuous wear coupled to a hearing inducing bone structure of the user and comprising a driving portion, a driven portion and intermediate relatively-stiff elastic elements interconnecting said driving and driven portions so as to permit a limited vibratory movement between at least parts of both portions; said driving and said driven portions having elements forming part of a magnetic structure including a magnetic gap across which said portions vibrate; electrical means secured to said driving portion for actuating said portions throughout the principal speech frequency range and producing corresponding vibrations between said portions; a casing forming part of said unit and secured to said driving portion; a contactor directly secured to said driven portion for engaging the bone structure of the user; said contactor forming at least part of a wall of said casing having a wall portion with lateral dimensions sufficiently extended and so arranged under the driving portion as to maintain said vibratory unit in a stable equilibrium coupling position on the bone structure under a relatively small external force; and supporting means firmly mechanically coupled to the driving portion for holding said driven portion with the contactor in engagement with said bone so that the contactor vibrates relatively to said driving portion and said supporting means when said unit is actuated by the electrical means for transmitting the vibrations of the contactor through the bone structure to the inner ear; the mass of said driving portion being only a small fraction of the mass of the body of said bone structure, and being sufficiently large and sufficiently actuated by said electrical means as to impart to said driven portion, and through its contactor to the bone, the vibratory energy required for inducing intelligible hearing of speech by bone conduction.

LIEBER PATENTS CORPORATION,
*Assignee of Hugo Lieber, Deceased,*
By CHARLES P. FRANCHOT,
*President.*